Patented November 15, 1904.

UNITED STATES PATENT OFFICE.

HENRY COLBECK MICHELL, OF LONDON, ENGLAND.

MANUFACTURE OF NON-CONDUCTING COVERINGS, BLOCKS, AND SLABS.

SPECIFICATION forming part of Letters Patent No. 774,946, dated November 15, 1904.

Application filed November 27, 1903. Serial No. 182,887. (No model.)

*To all whom it may concern:*

Be it known that I, HENRY COLBECK MICHELL, a subject of the King of Great Britain and Ireland, residing in the city of London, England, have invented Improved Manufacture of Non-Conducting Coverings, Blocks, and Slabs, of which the following is a specification.

This invention has reference to an improved manufacture of that kind of non-conducting coverings, blocks, and slabs suitable for covering steam pipes, boilers, and the like to protect them from loss of heat by radiation and for other purposes where it is desired to prevent the passage or flow of heat that are composed of or contain flakes or particles of mica and a silicious binding agent, such as silicate of soda, with or without addition of light porous or open filling material—such, for example, as wood fiber of the kind known commercially as "excelsior," slag-wool, asbestos, or like fibrous material or granulated or flaked cork or the like, as mentioned in the specification of other Letters Patent of the United States granted to me, No. 732,207; and it has for object to produce non-conducting coverings, blocks, or slabs that shall not be injuriously affected by fluid or other substance likely to come in contact with them when in use, so that they shall be rendered very durable and efficient. For imparting a non-hygroscopic nature to such coverings, blocks, and slabs (hereinafter, including the claims, referred to generally as "non-conducting" bodies) I have described in my said former specification the use, in conjunction with the silicate of soda employed in their manufacture as a binding agent, of a substance such as acetate of lead, with or without an addition of lime. Although by this means the non-conducting bodies are rendered non-hygroscopic and efficient in use, yet they are not water and damp proof and are liable to become disintegrated by the action of water or steam that may be brought into contact with them, owing to leakage from the pipes or other bodies to which they are applied; and my present invention is designed to obviate these drawbacks and produce still more efficient and durable non-conducting bodies and such as shall be capable of better withstanding the injurious action of air, water, and steam that may come in contact with them. For this purpose in the manufacture of non-conducting bodies of the kind referred to composed of or containing micaceous material and a fusible silicious binding agent—for example, silicate of soda, clay, and the like—such a body after being molded or formed to shape and dried is according to this invention subjected to a high temperature in such a manner as to cause the silicious binding agent used to unite or combine with the flakes or particles of mica in the body in such a way as to render the latter very durable and efficient. The heating may conveniently be effected by firing in a kiln at a temperature, say, for example, up to about 1,000° centigrade, (one thousand degrees centigrade,) so as to fuse, vitrify, or cause the silicate of soda or other silicate in the non-conducting body to unite chemically with the mica and form a compound silicate therewith. To avoid or reduce the liability of any so-treated article losing its shape by warping, it is desirable that care be taken to prevent its being too rapidly cooled.

The non-conducting body may be built up and formed to shape in the manner heretofore usual—as, for example, in the manner described in my said former specification—and with or without addition of light porous or open filling material of the kind hereinbefore referred to and with or without addition to the silicate of soda of other material—for example, acetate of lead—as and for the purpose hereinbefore mentioned. Thus the non-conducting body may be formed by spreading a mixture having a consistency corresponding to about that of ordinary mortar and composed of mica flakes and a solution of silicate of soda in a layer, covering such layer with a mass of material composed of mica flakes and a light porous or open filling material of the kind hereinbefore referred to, the mica flakes being arranged so that their flat surfaces will be approximately at right angles to the direction in which heat would pass through the resulting body, covering the said mass with a layer of mica flakes, pouring a solution of silicate of soda over the whole mass, and drying the resulting body. In this case the mica and silicate of soda in the external portion of the body will upon firing the same in a kiln, as hereinbefore set forth, be combined, so as to form a shell or coating having the properties of durability, closeness and hardness of texture, of being water and damp proof, and not liable to disintegration under the action of water or steam. Usually, however, it will be preferable to add silicate of soda to the whole of the mica used in the formation of the non-conducting body, so that the two will be combined, in the manner described, more or less throughout the mass of the body, the mica when flakes thereof are used being, as heretofore, arranged as far as possible parallel to one another and so as to be as nearly as possible at right angles to the direction of radiant heat from the article or structure to which the non-conducting body is applied.

The solution of silicate of soda may be of the strength (75° Twaddle) ordinarily sold in commerce and be used in such proportion with the flake mica as to form therewith a wet mass having the consistency of, say, ordinary wet mortar, so that the result of heating the mixture, as set forth, will be to cause the flakes of mica by the fusion of vitrification of the silicate to adhere firmly together without causing the non-conducting body to lose its shape.

Any excess of silicate of soda that may be present in the body when formed to shape will be caused to exude therefrom during the preliminary drying thereof by heat.

The interiors of non-conducting bodies having shells or coatings formed as hereinbefore described may be charged with non-conducting material of various kinds other than mica and light porous or open filling material of the kind hereinbefore referred to.

In some cases refractory fibrous material—for example, asbestos fiber—may be added to the mica and binding agent to produce a stronger and tougher product.

Although in the example given 1,000° centigrade has been mentioned as a suitable temperature to which a non-conducting body according to this invention might be heated, I do not limit myself to such temperature, as in some cases lower or higher temperatures might within reasonable limits be advantageously employed, so long as the requisite union of the ingredients is effected.

Non-conducting bodies may be produced, as hereinbefore described, with close and durable outer crusts or shells inclosing inner portions consisting of light porous or open filling material or may be formed of an intimate mixture of mica, filling material, a binding agent, and a non-hygroscopic substance molded to shape, as described in my said former specification. When such open or filling material consists wholly or partly of matter that will be charred or burned out during the subsequent heating of the non-conducting body, the porosity and non-conducting properties of the resulting product will in many cases be enhanced.

Although the invention has been described with more particular reference to the production of non-conducting bodies for preventing loss of heat by radiation, it is obvious that such bodies are also applicable for preventing absorption of heat—as, for example, in the case of pipes used for conveying cooled brine in refrigerating apparatus.

What I claim is—

The herein-described method of making non-conducting bodies which consists in forming an intimate mixture of mica flakes and silicate of soda, subjecting the mixture to extreme heat to fuse the silicate and chemically unite the elements, and slowly cooling the mass, whereby a dense hard vitreous product is obtained.

Signed at London, England, this 18th day of November, 1903.

HENRY COLBECK MICHELL.

Witnesses:
H. D. JAMESON,
F. L. KANDS.